US008949354B2

(12) United States Patent
DeLuca et al.

(10) Patent No.: US 8,949,354 B2
(45) Date of Patent: Feb. 3, 2015

(54) PROPAGATION OF MESSAGE HAVING TIME-BASED INFORMATION

(75) Inventors: Lisa Seacat DeLuca, San Francisco, CA (US); Lydia M. Do, Raleigh, NC (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/450,525

(22) Filed: Apr. 19, 2012

(65) Prior Publication Data

US 2013/0282836 A1     Oct. 24, 2013

(51) Int. Cl.
*G06F 15/16* (2006.01)

(52) U.S. Cl.
USPC ............................ 709/206; 709/223; 709/224

(58) Field of Classification Search
CPC ..... G06Q 10/10; G06Q 10/1095; H04L 67/22
USPC .......................................... 709/206, 223, 224
See application file for complete search history.

(56) References Cited

U.S. PATENT DOCUMENTS

| | | | |
|---|---|---|---|
| 2003/0018724 A1* | 1/2003 | Mathewson et al. | 709/206 |
| 2005/0144245 A1 | 6/2005 | Lowe | |
| 2007/0101284 A1* | 5/2007 | Shaw et al. | 715/772 |
| 2008/0034315 A1 | 2/2008 | Langoulant et al. | |
| 2008/0126951 A1 | 5/2008 | Sood et al. | |
| 2008/0294663 A1* | 11/2008 | Heinley et al. | 707/100 |
| 2010/0070584 A1 | 3/2010 | Chen et al. | |
| 2010/0070888 A1 | 3/2010 | Watabe et al. | |
| 2010/0179961 A1* | 7/2010 | Berry et al. | 707/769 |
| 2010/0223664 A1 | 9/2010 | Naranjo et al. | |
| 2011/0072097 A1 | 3/2011 | Prahlad et al. | |
| 2011/0106892 A1* | 5/2011 | Nelson et al. | 709/206 |
| 2011/0173548 A1 | 7/2011 | Madnani | |
| 2011/0219315 A1* | 9/2011 | Bier et al. | 715/752 |

FOREIGN PATENT DOCUMENTS

JP     2009277042 A     11/2009

OTHER PUBLICATIONS

Bellotti, Victoria, et al., "Taking Email to Task: The Design and Evaluation of a Task Management Centered Email Tool," Paper: Integrating Tools and Tasks, Apr. 5-10, 2003, vol. 5, No. 1.
Dredze, Mark, et al, "Automatically Classifying Emails into Activities," IUI, 2006, Jan. 29-Feb. 2006.
Faulring, Andrew, et al., "Agent-Assisted Task Management that Reduces Email Overload," IUI, Feb. 7-10, 2010.
Kushmerick, Nicholas, et al., "Automated Email Activity Management: An Unsupervised Learning Approach," IUI, Jan. 9-12, 2005.
Rohall, Steven L., et al., "ReMail: A Reinvented Email Prototype," IBM, Oct. 28, 2003.
IBM Inventors, "Cross Association: Inbox Prioritization using Diary," Aug. 19, 2005, Database: IP.com, IP.com No. IPCOM000127260D.
Google Calendar, Automatic Event Recognition in Gmail, http://support.google.com/calendar/bin/answer.py?hl=en&answer=4 . . . , printed on Apr. 17, 2012.
BlackBerry, "How to Add Facebook Events to the Calendar Application on the Blackberry Smartphone," http://btsc.webapps.blackberrry.com/btsc/viewdocument/do;jsessioni . . . , printed on Apr. 17, 2011.
English Abstract of JP 2009277042.
Cselle et al., "BuzzTrack: Topic Detection and Tracking in Email", IUI '07, Jan. 28-31, 2007.

\* cited by examiner

*Primary Examiner* — Nicholas Taylor
(74) *Attorney, Agent, or Firm* — Cahn & Samuels, LLP

(57) ABSTRACT

A method for propagating a message includes searching a plurality of messages for time-based information; associating located time-based information with the corresponding message as meta-data; extracting the meta-data and propagating the message as the time-based information approaches; and displaying the propagated message in a graphical user interface.

22 Claims, 8 Drawing Sheets

PROPAGATION OF MESSAGE HAVING TIME-BASED INFORMATION

BACKGROUND

The present invention is directed to a system and methods for time-based message communication, in particular for propagation of a time-based message such as an email or social networking message.

Often a user receives an email message that includes time-related information. For example, an email might include information on an upcoming event. Currently, it is up to the recipient of the email to create a reminder about the event, such as via a ToDo list or a calendar entry. However, even when a reminder is created, the recipient must manually copy and paste the content of the email into the reminder for reference. If recipients do not do this, and they still manage to remember the event is coming up, they also need to remember who sent the email and/or details about the email in order to retrieve it from their email inbox.

SUMMARY

According to an embodiment of the present invention, a method for propagating a message includes searching a plurality of messages for time-based information; propagating at least one message comprising time-based information as the time-based information approaches; and displaying the propagated message in a graphical user interface.

According to another embodiment of the present invention, a method for propagating a message is provided. At least one message is searched for information comprising at least one of time, date, or event. The information is extracted from the at least one message. A display of messages in a graphical user interface is dynamically and automatically changed to propagate the at least one message as the at least one of time, date, or event approaches.

According to another embodiment of the resent invention, a system for propagating a message includes at least one electronic or digital device; a search engine for mining a plurality of messages for time-based information; a controller for extracting time-based information from a message and for propagating the message; and a graphical user interface for displaying at least one propagated message.

According to another embodiment of the present invention, a computer program product for propagating a message including a computer readable storage medium is provided. First program instructions search a plurality of messages for time-based information. Second program instructions extract time-based information from the corresponding message. Third program instructions propagate the message as the time-based information approaches. Fourth program instructions display the propagated message in a graphical user interface. The first, second, third, and fourth program instructions are stored on the computer readable storage medium.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In this detailed description, references to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

DETAILED DESCRIPTION

The discussion below is focused on propagation of messages within an e-mail system or environment; however, the present invention is not so limited and may be applied to other social networking systems, such as messages (e.g., tweets) in TWITTER® or status messages or wall posts in FACEBOOK® or LINKEDIN® and the like.

According to the system and methods of the present invention, a user's messages are searched or mined for time-based or time-related information. Any time-based information is extracted from the message. The message is propagated, for example within an e-mail or social networking system, as a future event comprising the time-based information becomes closer. Thus, users no longer need to dig through their messages to find messages related to a particular event. Rather, a user's graphical user interface is dynamically changed to display propagated messages based upon upcoming time-based information.

According to one or more embodiments of the present invention, a message is propagated before and/or during an event, so that the message is "up-front and center" for a user to reference. Thus, users can prepare themselves for upcoming events, as a message is propagated and grabs the user's attention, thereby serving as a reminder. In addition, immediately following an event, users can reference a message while a topic is fresh on their minds.

Figure 1:
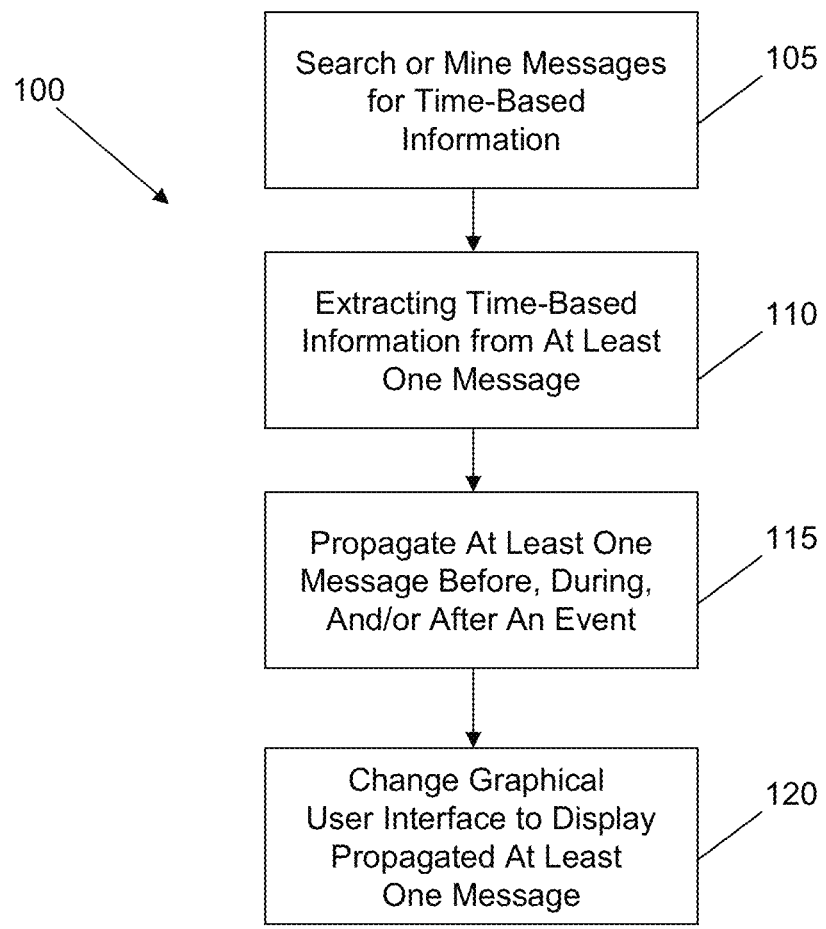
FIG. 1 is a flowchart of a method according to an embodiment of the present invention.

With reference now to FIG. 1, a method 100 according to an embodiment of the present invention is illustrated. Messages (e.g., email messages) are searched or mined for time-based information, 105. According to one or more embodiments, email messages within a user's email application (e.g., for example, at least one of Inbox, Sent, Deleted, or Saved folders) are mined for time-based information. Messages across a user's entire account or plurality of accounts may be searched according to the present invention.

Time-based information may include, but is not limited to, at least one of time, date, day, or event information. According to the present invention, the time-based information may be determined based on the context of the message. For example, received email segments containing time-based information may include, but are not limited to, "package will expect to be delivered on January 3rd before 7 p.m."; "Evite® event for Tuesday February 14th"; "Can't wait for our lunch in two weeks!"; 1 year ago; April 15; Labor Day; Christmas, and the like. In one or more embodiments, time-based information may be determined from meta-data associated with a message.

Located time-based information is extracted from the corresponding message, 110. At least one message is propagated (e.g., transmitted out of queue) before, during, or after an event corresponding to the time-based information, 115. A user's graphical user interface is changed to display propagation of the at least one message, 120. Thus, the present invention may bring attention to a user about information (e.g., text, documents, attachments, links) within at least one message comprising time-based information.

A user of a messaging system or application may have the ability to turn the method of the present invention on and off, for example, via a toggle, switch, or button in a graphical user interface.

According to one or more embodiments, a user may set a preference for the amount of time before an event in which at least one message having time-based information should be propagated. In specific embodiments, the user preference may comprise at least one of: a universal time-based setting (e.g., always show an email 1 day before the time, date, or event); a user-specific setting (e.g., if the email is from Bob show the email 1 week before the event); a setting according to a social network relationship (e.g., if the email is from my Boss, show 1 week before; if the email is from first degree friends show 3 hours before the event); or immediately (e.g., display immediately).

After an event has ended, any propagated message may be returned to its original position, for example, in a user's inbox or other folder. In at least one embodiment, a user may set a preference for the amount of time after an event in which at least one message having time-based information should be propagated. This user preference may be similar to the time settings discussed above for propagation of at least one message before an event. In one or more embodiments, at least one message may remain propagated until the user marks the message as done, complete, or finished. Alternatively, at least one propagated message may have a time lapse indicator (e.g., 2 hours after the event or meeting, return a propagated email to its normal status or queue).

Figure 2:
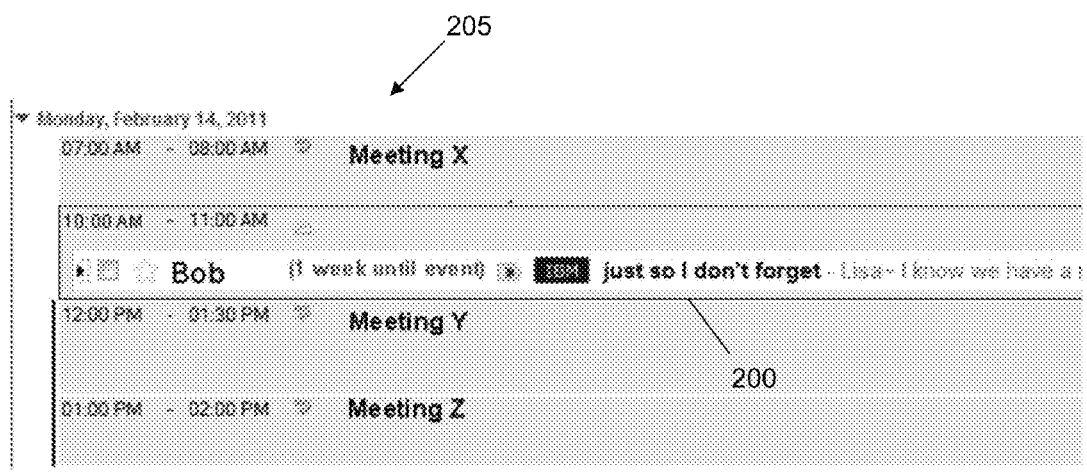
FIG. 2 is a screenshot of a propagated email displayed within a user's online calendar according to an embodiment of the present invention.

A user may set a display preference for which a graphical user interface may change due to the message propagation. For example, a propagated email may be assigned a separate icon; may be moved to a top of an inbox queue; may be shown in a separate section or field of an inbox or email application; or may appear as an entry in an online calendar application. The graphical user interface may also change by displaying a propagated message with at least one of a colored background, a media file, or stylized text. With reference now to FIG. 2, a propagated email 200 may be displayed within a user's online calendar 205 similar to a calendar event.

Extracted time-based information and at least one of user time preferences or user display preferences may be used to determine how a message is to be propagated. Thus, the present invention allows for the display of a customized view of propagated messages related to a particular time and/or date as that time and/or date approaches and then reverts back to display of a normal view of existing messages as the time and/or date is passed (i.e., a propagated message is removed from a custom or prioritized view).

If more than one message is to be propagated, multiple messages may be organized based on at least one of an event date (e.g., emails with events that are sooner will appear at the top of a list) or according to a defined priority (e.g., if an email has a higher priority, even if the date is further way, it might be displayed first).

Figure 3:
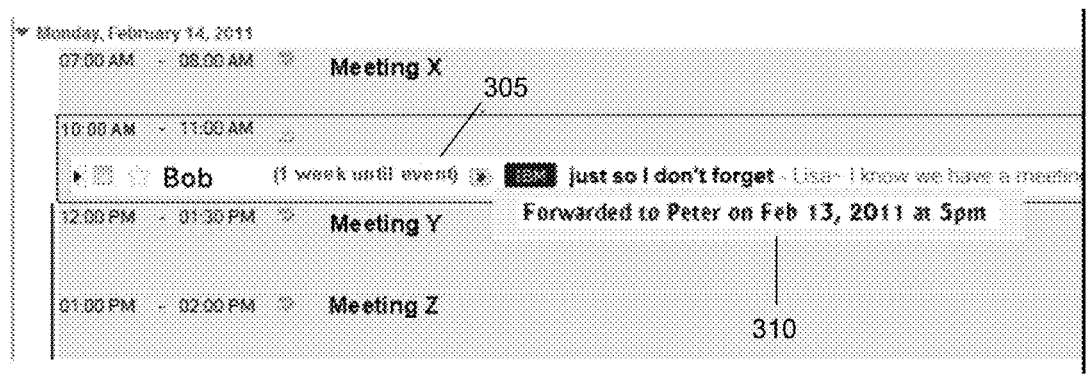
FIG. 3 is a screenshot of an action trace of a propagated email according to an embodiment of the present invention.

According to one or more embodiments, a message that comprises an action due date (i.e., a date that requires some action by the recipient) may be put or propagated automatically into a separate view or folder to remind the recipient that the message contains time-sensitive material. A summary-of-action trace can be viewed to show what action the user has done regarding the message. With reference now to FIG. 3, when a user puts the mouse over a propagated email message 305, it shows that the user has forwarded the email to Peter on Feb. 13, 2011 at 5 p.m. (i.e., the action trace is displayed), 310. In one or more embodiments, the propagated message may automatically be removed from the view/folder/calendar if the user has taken the required action, such as responding to or forwarding the email.

Figure 4:
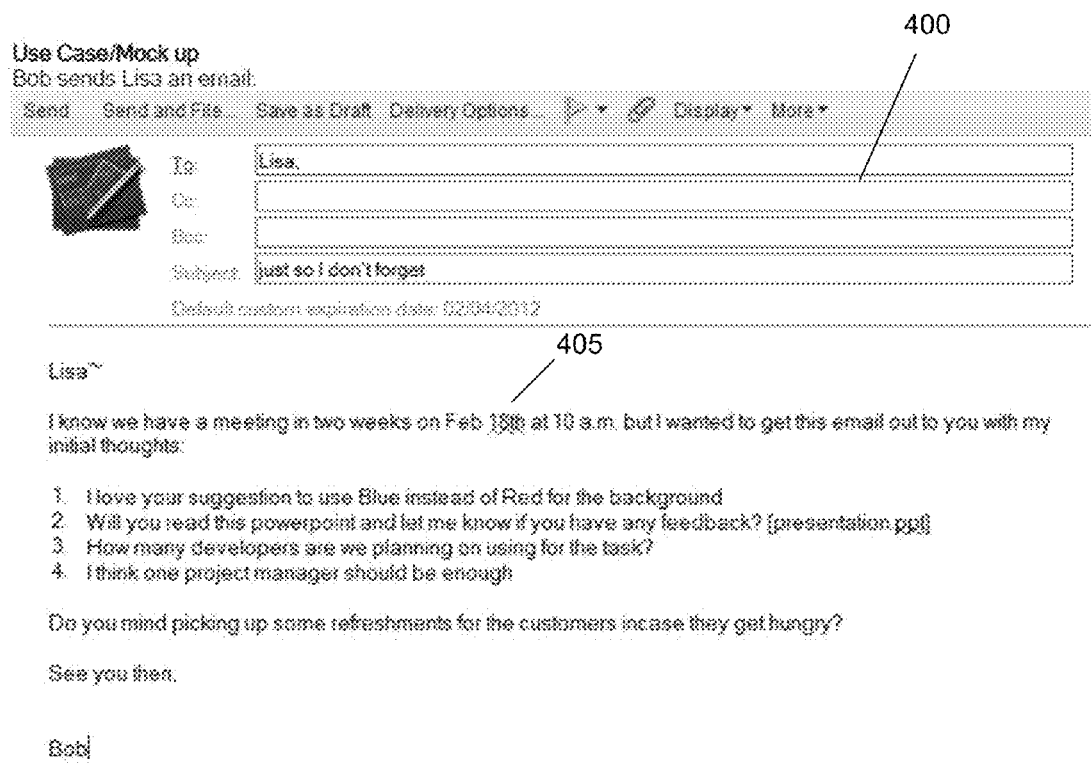
FIG. 4 is an email message that is to be mined according to the present invention.

With reference now to FIG. 4, Lisa enables email propagation and specifies that she would like to be alerted about upcoming events from Bob one week in advance according to a user-specific time setting. Bob sends Lisa an email message 400 with the time-based information "meeting in two weeks on February $18^{th}$ at 10 a.m.", 405. If on February 10th, Lisa checks her email inbox, the message from Bob is not propagated because she chose not to propagate until a week before (not shown).

Figure 5:
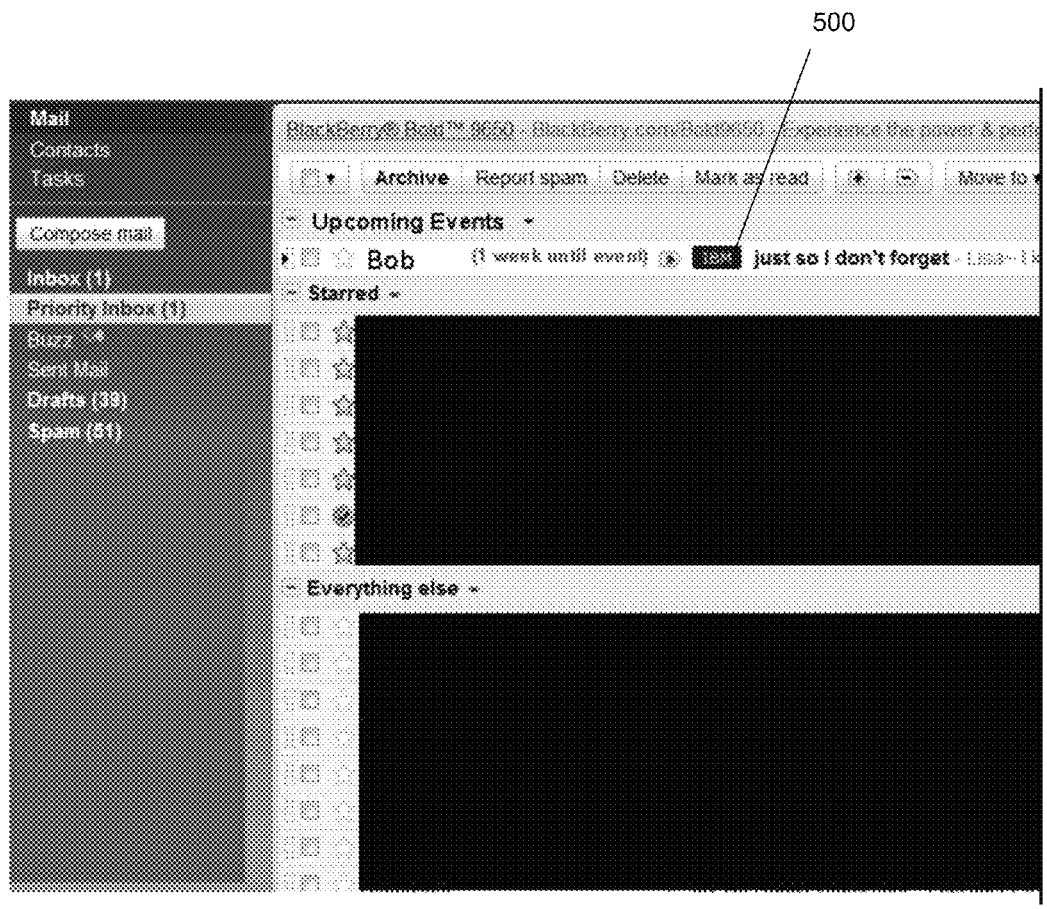
FIG. 5 is a screenshot of an email system having a propagated area according to an embodiment of the present invention.
Figure 6:
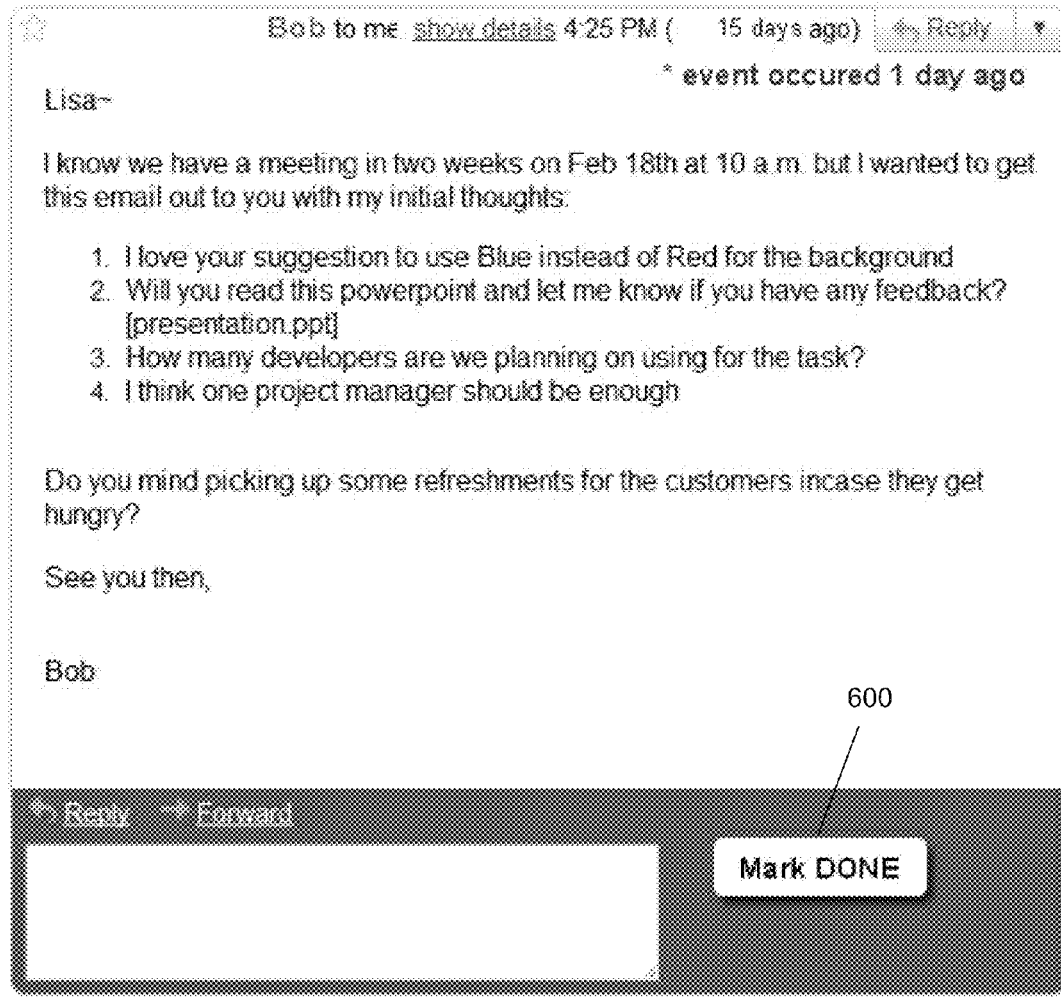
FIG. 6 is a screenshot of a propagated email with a field to mark DONE according to an embodiment of the present invention.

With reference now to FIG. 5, if on February $11^{th}$ (one week before the meeting) Lisa checks her email inbox, she sees Bob's propagated email message within a propagated area or field 500 ("Upcoming Events"). Lisa's user display preference was to keep any propagated email message within a propagated area until she chooses to end it. With reference now to FIG. 6, once Lisa chooses to mark Bob's email as done, 600, her inbox will remove Bob's email from the propagated area and return it to its normal position (e.g., lower in a queue of emails organized by date).

Figure 7:
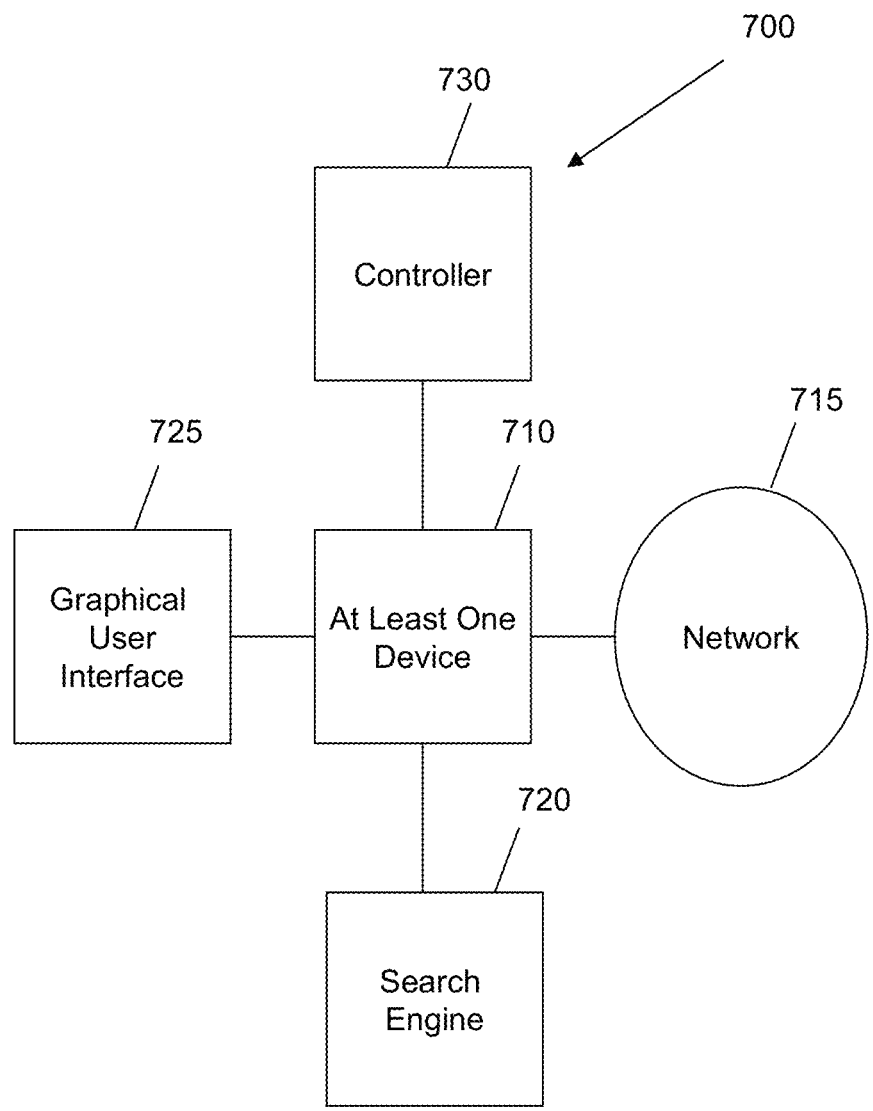
FIG. 7 is a schematic diagram of a system according to an embodiment of the present invention.

With reference now to FIG. 7, a schematic diagram illustrates a system 700 according to an embodiment of the present invention. The system includes at least one electronic or digital device 710 (e.g., a personal computer, cellular telephone, tablet computer, personal digital assistant, game device, MP3 player, television). The at least one device may be connected to a network 715 (e.g., the internet, World Wide Web, intranet, local area network (LAN), wide area network (WAN)). The system includes a search engine 720 for mining emails for time-based information and a graphical user interface 725 in communication with the search engine for displaying at least one message to a user. As used herein, "in communication" includes physical and wireless connections that are indirect through one or more additional components (or over a network) or directly between the two components described as being in communication. The at least one device 710 and graphical user interface 725 may comprise, or be in communication with, a controller 730 for determining and/or extracting time-based from a message and for propagating at least one message in the graphical user interface 725. The controller 730 may comprise one or more processors having embedded application logic or program code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) present on a computer storage medium or computer program product, or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
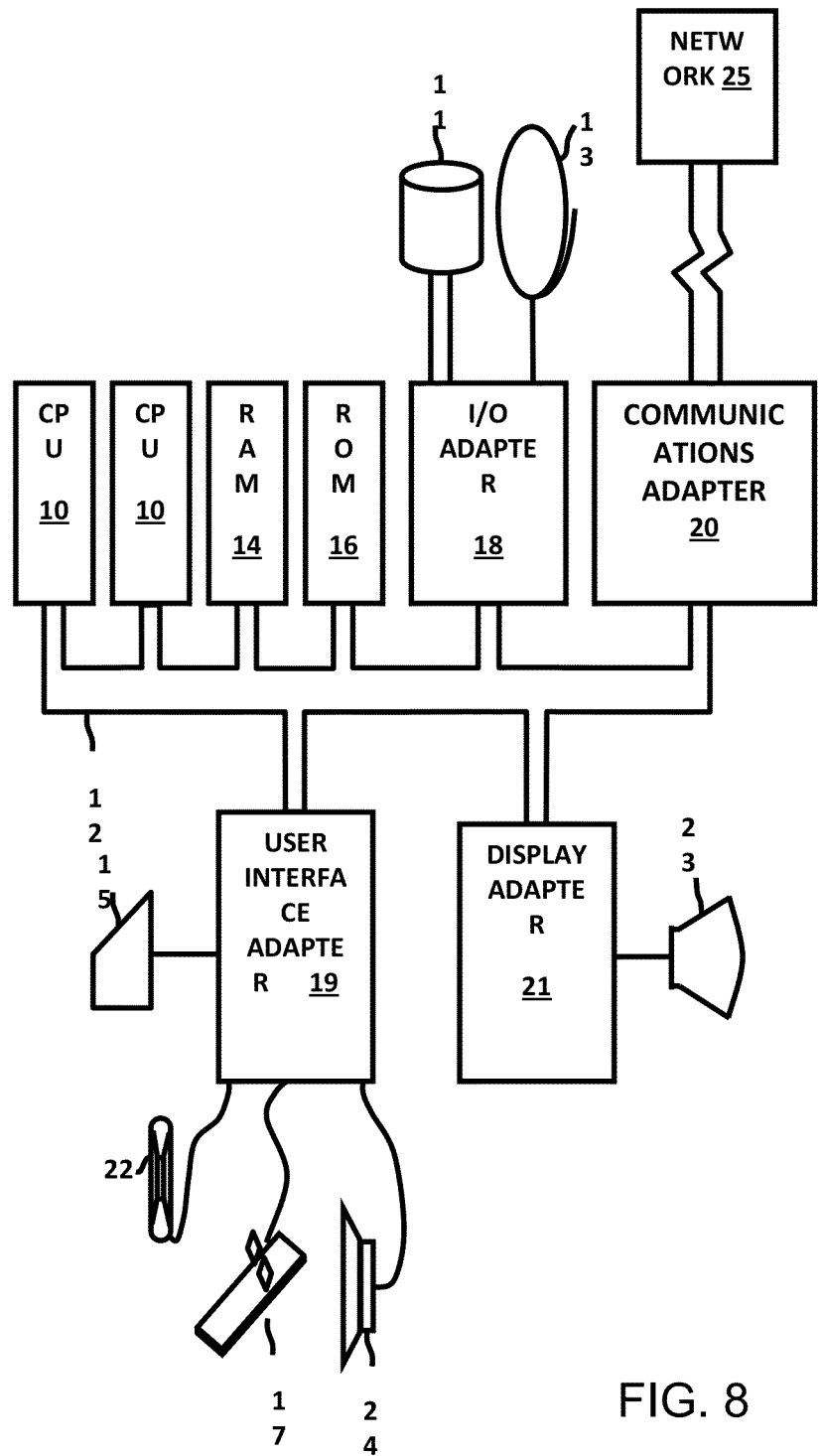
FIG. 8 is a schematic diagram of another system according to an embodiment of the present invention.

Referring now to FIG. 8, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for propagating a message, comprising:
    searching content of a plurality of messages for time-based information, the plurality of messages comprising a message or a post within a social networking environment;
    extracting the time-based information based on the content of the plurality of messages; and
    dynamically and automatically changing a display of messages in a graphical user interface, wherein said dynamically and automatically changing comprises:
        propagating at least one message comprising time-based information as the time-based information approaches, said propagating of the at least one message comprising moving the at least one propagated message to a top of an e-mail inbox of a user;
        displaying the at least one propagated message in a calendar of the user; and
        propagating at least one message after the time-based information has passed, wherein the method is performed within a social networking system.

2. A method according to claim 1, wherein the time-based information comprises at least one of time, date, day, or event information.

3. A method according to claim 1, wherein said propagating comprises transmitting the message out of queue before the time-based information occurs.

4. A method according to claim 1, comprising propagating at least one message before an event.

5. A method according to claim 1, comprising establishing a setting for an amount of time before an event in which at least one message having associated meta-data is propagated, said establishing performed by a recipient of the at least one message.

6. A method according to claim 5, wherein said setting comprises at least one of a setting for a specific user or a setting according to a social network relationship.

7. A method according to claim 1, wherein the at least one message remains propagated until the user marks it as done.

8. A method according to claim 1, wherein the at least one message remains propagated pursuant to a time lapse indicator.

9. A method according to claim 1, comprising establishing a setting for an amount of time after an event in which at least one email message having associated meta-data is propagated.

10. A method according to claim 9, wherein said setting comprises at least one of a setting for a specific user or a setting according to a social network relationship.

11. A method according to claim 1, wherein said displaying comprises displaying a propagated message as an icon.

12. A method according to claim 1, wherein the displaying comprises displaying a propagated message with at least one of a colored background, a media file, or stylized text.

13. A method according to claim 1, wherein said displaying comprises displaying a propagated message in a separate field or section of a message application.

14. A method according to claim 1, wherein said displaying comprises a propagated message in an online calendar.

15. A method according to claim 1, wherein when a propagated message comprises an action due date, said method further comprises displaying an action trace for the message to show what action the user has performed on the message.

16. A method according to claim 1, wherein said dynamically and automatically changing a display of messages comprises presenting a customized view of messages based on extracted meta-data and at least one of user time preferences or user display preferences.

17. A system for propagating a message, comprising:
    at least one electronic or digital device;
    a search engine for mining content of a plurality of messages for time-based information, the plurality of messages comprising a message or a post within a social networking environment;
    a graphical user interface; and
    a controller for extracting time-based information from the plurality of messages and dynamically and automatically changing a display of messages in the graphical user interface, said dynamically and automatically changing including propagating the message within a social networking system, displaying the propagated message in a calendar of a user, moving the propagated message to a top of an e-mail inbox of the user, and propagating the propagated message after the time based information has passed within a social networking system.

18. A system according to claim 17, wherein the controller comprises one or more processors with embedded computer code or application logic.

19. A computer program product for propagating a message, comprising:

a non-transitory computer readable storage medium;

first program instructions to search a content of a plurality of messages for time-based information, the plurality of messages comprising a message or a post in a social networking environment;

second program instructions to extract time-based information from a corresponding message;

third program instructions to propagate the message within a social networking system as the time-based information approaches; and fourth program instructions to dynamically and automatically change a display of messages in a graphical user interface including displaying the propagated message in a calendar of a user, and moving the propagated message to a top of an e-mail inbox of the user, wherein said first, second, third, and fourth program instructions are stored on said computer readable storage medium, and wherein said fourth program instructions further comprise instructions to propagate at least one message within a social networking system after the time-based information has passed.

20. A method according to claim 1, wherein the at least one propagated message comprises an email message.

21. A system according to claim 17, wherein the propagated message comprises an email message.

22. A computer program product according to claim 19, wherein the propagated message comprises an email message.

* * * * *